United States Patent

[11] 3,605,085

| [72] | Inventors | John L. Fiorita<br>Box 58 Rd #2, Cheswick, Pa. 15024;<br>Harold H. Shaffer, Jr., 613 Saxonburg Rd.,<br>Pittsburg, Pa. 15238 |
|---|---|---|
| [21] | Appl. No. | 850,752 |
| [22] | Filed | Aug. 18, 1969 |
| [45] | Patented | Sept. 14, 1971 |

[54] BRAKE LINING WEAR DETECTION MEANS
9 Claims, 5 Drawing Figs.

[52] U.S. Cl.................................................... 340/52 A,
200/61.4, 200/61.41, 200/61.44, 200/47
[51] Int. Cl................................................ B60q 1/44
[50] Field of Search........................................... 340/52;
200/61.4, 61.41, 61.42, 61.44, 47

[56] References Cited
UNITED STATES PATENTS
3,282,241 11/1966 Forbush..................... 188/1 A UX
3,321,045 5/1967 Veilleux....................... 340/52 A UX Primary Examiner—John W. Caldwell
Assistant Examiner—William M. Wannisky
Attorney—Carothers and Carothers ABSTRACT: Brake lining wear detection means to indicate when the brake lining on a motor vehicle brake assembly, either the conventional type or disc type, has worn to a preselected wear limit indicative of replacement wherein there is provided limit switch means in the detection circuit and mounted on the vehicle brake assembly in adjacent spaced relation relative to a brakeshoe in the brake assembly to operate the detection circuit when the brake lining wear has reached the preselected wear limit.

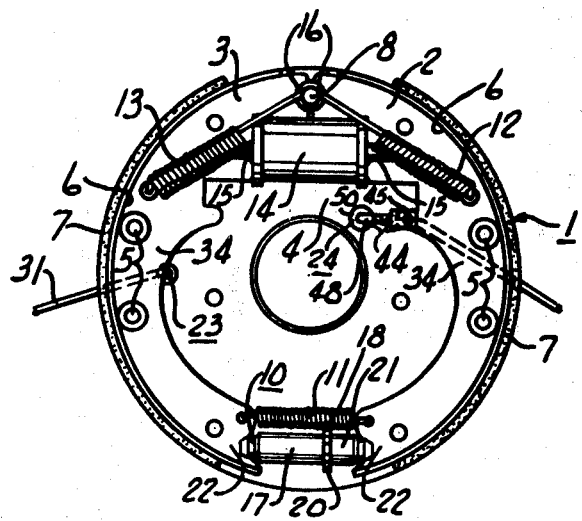
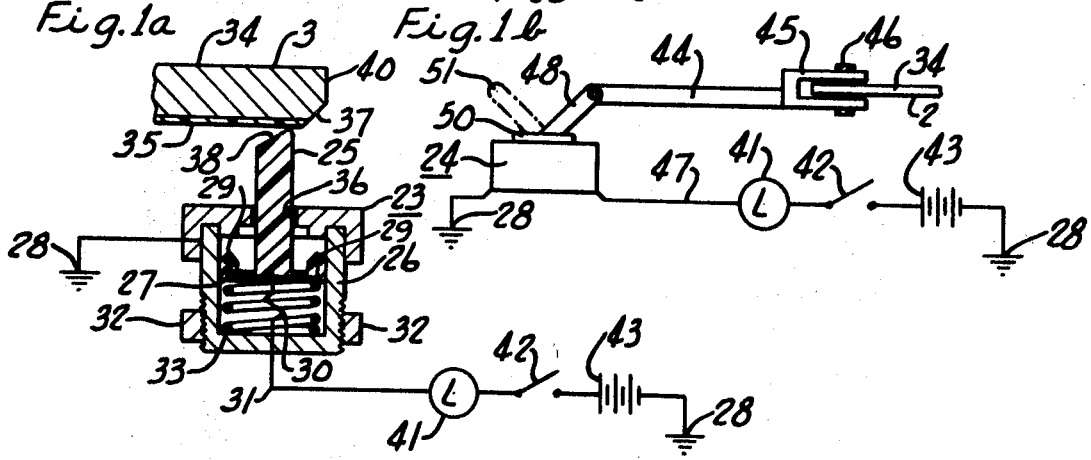
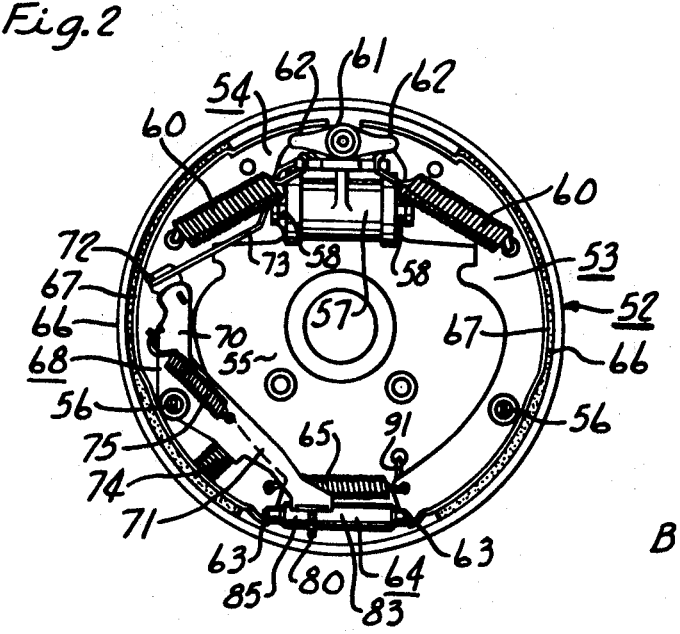

ELECTRICAL DETECTION CIRCUIT — 120

3,605,085

BRAKE LINING WEAR DETECTION MEANS

BACKGROUND OF THE INVENTION

This invention relates broadly to an electrical communication device, and more particularly to automatic means responsive to a condition of a motor vehicle, specifically the brake position and condition (340-52,69).

Many detection devices have been conceived in past years designed to inform operative personnel of motor vehicles of the condition of the brake assembly, and more particularly the condition of the brake shoe linings of the vehicle in order to insure that excess wear of the linings will not occur, which would cause damage to the brake assembly in the form of scoring the brakedrum and, further, eventual failure of the brake to take hold, all because of neglect of checking on a periodical basis the condition of the brake lining. Examples of such devices are found in the following U.S. Pat. Nos.

Fratus 2,731,619 (340-52)
Rizzo 2,981,929 (340-52)
Trebonsky 3,297,985 (340-69)
Adamson 3,423,729 (340-52)

Such devices give indication to operating personnel that the brakeshoe lining is in such condition that operation of the vehicle is being carried out under unsafe conditions.

With the advent of self-adjusting brakes and regular inspection programs required by statute in most states, inspection of brake lining wear is carried on periodically, such as, for example, twice a year. However, due to ever-increasing traffic found on American highways, coupled with the increasing demand for use of the vehicle brake system in driving defensively to insure safety of the vehicle operator and occupants of the vehicle, it is not uncommon to find an increased percentage in brake shoe lining wear between required inspection periods as compared to past years. This necessitates more frequent inspection of the brake shoe linings to determine if replacement of the linings is necessary. With self-adjusting brakes in most vehicles today, most operating personnel do not take the time or make the effort to inspect the brake linings to determine the extent of wear between inspection periods. As a result, it is even more incumbant than ever before that operating personnel be provided, in line with the increasing safety requirements being imposed by the government in connection with the manufacture and construction of motor vehicles, with brake lining wear detection means to indicate to the operating personnel at any time during operation of the vehicle that the brake linings have worn to an unsafe limit, requiring replacement.

The detection means provided in U.S. Pat. Nos. 2,731,619 and 2,981,929 mentioned above, provide a detection circuit which visually indicates to operating personnel the condition of the brakeshoe lining, and more particularly if the lining has worn to an excessive limit. In this connection, the detection means of U.S. Pat. No. 2,731,619 has the drawbacks of only being operative when the operating personnel are applying the brakes. If the brake linings are further worn an incremental distance after initial visual warning of excessive brake lining wear, the detecting means will inhibit operation of the ignition system rendering it impossible to move the automobile conveniently to a service garage for brake lining repair. By the same token, stalling the vehicle by inhibiting operation of the ignition system is highly dangerous on our modern highways, particularly the interstate highways, since such a stalled vehicle on the highway would be a traffic hazard increasing greatly the chance for a multiple vehicle accident.

The detection means of U.S. Pat. No. 2,981,929, as well as that of U.S. Pat. No. 2,731,619, present the drawback in the form of the necessity of requiring installation of a detection switch within the brakeshoe lining which requires special preparation of the brake lining as well as the brakeshoe. It is a prime feature of this invention to eliminate this drawback since brake shoes and brake linings are standard items and the detection means of these patents would require initial lining and shoe preparation in connection with installation of a brakeshoe assembly, as well as each time the brake linings are replaced. Since the brake linings are the one component frequently replaced in vehicle brake assemblies, the detection means should not be utilized in a manner to require special treatment to the brake linings each time they are replaced.

U.S. Pat. No. 3,297,985 provides a detection means for brake lining wear which eliminates the first of the above-mentioned disadvantages of U.S. Pat. No. 2,731,619 providing a detection means indicating excessive brake lining wear regardless of whether the brakes are being applied or not. However, the detection means still requires alteration of the standard brake lining, as well as preparation of the brakeshoe, to properly receive the detection switch to indicate excessive brake lining wear and permit operation of the detection circuit.

SUMMARY OF THE INVENTION

It is the principle object of this invention to provide brake lining wear detection means to indicate when the brake lining is worn to a preselected wear limit indicative of lining replacement wherein installation of a vehicle brake assembly, either of the conventional type or the disc type, or the replacement of brake linings does not necessitate alteration of the brake lining or require special or additional preparation of the brakeshoe and brake assembly.

Another provision comprising this invention is a brake lining wear detection means of improved structural quality and reliability operative as a standard safety feature in line with increasing federal government requirements for high safety standards in vehicles manufactured by the automotive and truck industry.

Another provision comprising this invention is a brake lining wear detection means provided with limit switch means mounted on the vehicle brake assembly so as to ascertain, when the vehicle brakes are applied, the relative difference in distance of movement of one or both brake shoes when the brake linings are new as compared to when the brake linings are worn to a preselected wear limit. The contacts in the switch means are in closed or contact position when the brake linings have reached the wear limit which operates a detection circuit to indicate the operating personnel through visual or audible means that the brake linings are in need of replacement. SUch a limit switch means may be of the plunger type wherein when the plunger is fully extended from the switch housing, that is, its normally biased position, the switch contacts will be closed to energize the detection circuit. The switch means may also be in the form of a toggle switch.

In connection with the brake assembly of the conventional type the limit switch of the plunger-type may be mounted on the brake backing plate or may be mounted on or within the brakeshoe adjusting screw assembly, the latter of which may be of the manual adjusting type or of the self-adjusting type found in practically all late-model vehicles today. In this connection, it is within the contemplation of this invention to use such limit switch means also in disc-type brake assemblies now being utilized in a number of new motor vehicle. In such a brake assembly, the limit switch means of the plunger-type may be secured to the brake assembly independently of the brake piston, the brake shoe or pad, and the rotatable brake disc so that as the brake pad is worn, the plunger will be permitted to slowly extend from the switch housing until switch contact is made, at which time the detection circuit is made operative to indicate that the brake pad has reached a wear limit necessitating replacement. The plunger-type switch would be mounted in the brake assembly in such a manner that the end of the plunger would be in contact with rearward surface of the brakeshoe.

Obviously, such a switching means could also be a solid-state semiconductor switching device.

Other objects and advantages appear in the following description and claims.

The accompanying drawings show, for the purpose of exemplification without limiting the invention or the claims thereto, certain practical embodiments illustrating the principles of this invention wherein:

FIG. 1 is a side elevation of a conventional brake assembly showing the brakeshoe assembly and the brake lining wear detection means of this invention.

FIG. 1a shows one embodiment of the brake lining wear detection means in combination with an electrical detection circuit.

FIG. 1b shows another embodiment of the brake lining wear detection means in combination with an electrical detection circuit.

FIG. 2 is a side elevation of a conventional brake assembly of the self-adjusting brake-type showing the brakeshoe assembly, the self-adjusting brake assembly, and the brake lining wear detection means of this invention.

Figure 3:
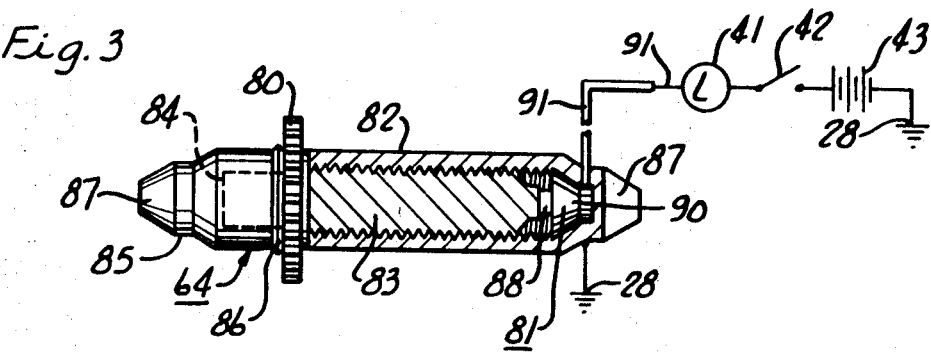
FIG. 3 is a cross section of a brakeshoe adjusting incorporating the switch means of the brake lining wear detection means of this invention.

Referring to FIG. 1 there is shown a conventional vehicle brake assembly 1 consisting of the brakeshoe assemblies 2 and 3 mounted upon a support housing in the form of the brake backing plate 4 by means of the shoe holddown cup and spring assemblies 5. Each of the brakeshoe assemblies 2 and 3 is provided with a brakeshoe 6 together with a brake lining 7 fastened to the brakeshoe 6 by suitable means such as rivets.

Anchor pin guide 8 is provided adjacent one edge of the backing plate 4 to receive for pivotal operation one end of each of the brakeshoe assemblies 2 and 3. The other end of the brakeshoe assemblies 2 and 3 are supported in space relation by means of the brakeshoe adjusting screw assembly 10, and these ends of the shoe assemblies 2 and 3 are held together on the brakeshoe adjusting screw assembly 10 by means of the connecting spring 11.

Each of the brakeshoe assemblies 2 and 3 respectively are provided with a shoe to anchor spring 12 and 13, the specific function of which is to return the brakeshoe assemblies to their proper positions immediately after the brakes have been released by the vehicle operator. As is well known, the brake shoe assemblies 2 and 3 are operated by means of the fluid-actuated wheel cylinder 14 which is supported between the two shoe assemblies by means of the wheel cylinder links 15. Upon application of fluid pressure to the wheel cylinder 14, the upper ends of the brakeshoe assemblies 2 and 3 are caused to move in opposed opposite directions to engage the surface of a brake engaging member, which in this case is a brakedrum (not shown) against the spring pressure of the return springs 12 and 13. Upon release of the fluid from the wheel cylinder 14, the return springs 12 and 13 cause the brakeshoe assemblies to assume their original position, that is, with their upper ends 16 in engagement with the anchor pin guide 8.

As is well known in conventional brakeshoe assemblies, the brakeshoe adjusting screw assembly 10 comprises the three major sections, the adjusting screw section 17, the adjusting screw stud section 18, which is rotatably adjustable within the adjusting screwnut section 17 and is provided further with the star wheel 20 to perform such adjustments, and the socket section 21. As can be seen, rotation of the star wheel 20 in either direction will cause the brakeshoe assembly ends 22 either to be drawn together or extended against the pressure of the connecting spring 11. Thus, the brakeshoe adjusting screw assembly 10 performs an adjusting feature in this conventional brake assembly wherein upon rotation of the star wheel 20, the brakeshoe assembly ends 22 may be further separated from one another a sufficient distance depending on the wear of the brake linings 7 of the brakeshoe assemblies 2 and 3 in order to insure further uniform wearing of the linings until the brake linings have reached a preselected wear limit, which is obviously just prior to the brake linings being worn to their rivets connecting them to the brakeshoes 6. If wear of the brake lining is permitted to continue to the heads of the rivets holding these brake linings to the shoes 6, scoring of the brakedrum will result, which is highly undesirable since this will necessitate refinishing of the brake-engaging surface of the drum.

Adjustment for brake lining wear through the brakeshoe adjusting screw assembly 10 is accomplished by the insertion of a screwdriver or other such tool into the vehicle brake assembly and using the end of the tool to rotate the star wheel 20.

In FIG. 1 there is shown two different embodiments of the limit switch means comprising this invention. The term "limit" is used here as to mean the limit switch actuator travel from its open contact position to its close contact position, which is respectively equal to the difference in the brake lining that when the lining is new as compared to when the lining is worn to the above-mentioned preselected wear limit.

As shown more clearly in FIG. 1a, the pushbutton-type switch 23 consists of the actuator 25 reciprocally mounted in the housing 26 and provided with the insulator 27 having the two electrical contacts 29 which are in turn connected by suitable electrical means 30 to the electrical conductor 31 as shown in FIGS. 1 and 1a. The housing 26 is connected to ground by being securely fastened to the brake backing plate 4 as by the nut 32 threaded on the housing 26.

As shown in FIG. 1, the plunger-type switch 23 is maintained in its open position as shown in FIG. 1a, since the upper end of its actuator 25 is held downwardly against the pressure of the spring 33 in the switch housing 26 by the flange 34 of the brakeshoe 6. As shown in FIG. 1a, the underside of the brakeshoe flange 34 may be provided with a smooth antifrictional surface such as shown at 35 in order that the operation of the brakeshoe assembly 3 will ride over the end of the actuator 25 with the least amount of frictional engagement. As the brakeshoe lining 7 is worn away to a preselected wear limit, it is evident that the end of the actuator 25 will finally slip out from beneath the flange 34 of the brakeshoe assembly 3. In the connection, it should be observed that the actuator 25 fits loosely within the opening 36 of the housing 26 in order to insure that upon release of the brakeshoe assembly from against the drum-engaging surfaces, the actuator 25 of the switch 23 will not again be placed in its open contact position as shown in FIG. 1a after the preselected wear limit has been reached. In order to insure this, a bevelled surface as indicated at 37 on the flange 34 may be provided as well as a bevelled surface 38 on the end of the actuator 25. Thus, as the brakeshoe returns to its normal position upon release of the brakeshoe assemblies, the edge 40 of the flange 34 will merely contact the side of the actuator 25 without pushing the same inwardly into its housing 26. Resetting of the plunger switch 23 may be accomplished by merely pressing it in as far as possible, and after replacement of the brake linings, application of the brakeshoes against the drum-braking surfaces will not be of a sufficient magnitude of travel distance to permit the actuator 25 to expose itself from beneath the flange 34 until the new but replaced brake linings 7 have been worn to the preselected wear limit.

As shown in FIG. 1a, the line 31 is connected through lamp 41 to the ignition switch 42 which is in turn connected across the vehicle battery supply 43, the other side of which is connected to the ground 28.

As shown in FIGS. 1 and 1b, the toggle-type switch 24 also may perform the limit switch means comprising this invention with respect to the electrical detecting circuit connected to the switch means which is placed in operative position when the brake linings have worn to the preselected wear limit, which is indicative of lining replacement. In this case, it will be observed that the toggle switch is in its closed position as shown in FIG. 1 and is connected to the flange 34 of the brakeshoe assembly 2 by means of the link connecting member 44. The end of this member 44 may be bifurcated as shown at 45 in FIG. 1b in order to be fastened by means of the pin 46, or other such suitable means, to the flange 34.

The electrical detecting circuit is the same as shown in connection with FIG. 1a wherein one contact of the toggle switch 24 is connected to ground 28 and its other contact is connected by means of electrical conductor 47 to the lamp 41, thence to the ignition switch 42 to the vehicle battery supply 43, the other side of which is connected to ground 28 to complete the circuit.

The toggle switch 24 has the actuator 48 in the form of a toggle and is fastened to the brake backing plate 4 through an opening provided therein by means of the holddown nut 50.

The toggle or actuator 48 is of the type that can move through an arcuate distance of approximately 90° from its close contact position shown in dotted line 51 in FIG. 1b to its closed position which is shown in full lines in FIG. 1b. Operation of the brakeshoe assembly 2 will force the toggle 48 from its open position shown in dotted line configuration 51 toward the closed position as shown in FIG. 1b. However, the toggle 48 must be displaced the major portion of its 90° arcuate distance to be locked into its closed position, such as 70° of its full arcuate distance. Thus, it can be seen that when the toggle is not pulled a sufficient degree because the brake linings have not worn to the preselected wear limit, the toggle 48 will return to its dotted line position 51. However, when the brake linings have worn to their preselected wear limit, the toggle switch will be pulled a sufficient distance to place the toggle in its closed position as shown in FIG. 1b. It should be realized that the connecting member 44 consists of a flexible material so that after the toggle 48 has been placed in its closed position, release of the brakeshoe assembly 2 will merely cause the connecting member 44 to flex, the force of which is insufficient to cause the toggle 48 to return to its open or dotted line position 51.

In connection with the electrical detecting circuit as shown in FIGS. 1a and 1b, the lamps 41 may be placed in a suitable position on the dashboard of the vehicle so that the operator may be immediately notified that there is existing in the vehicle brake assembly a brake lining wear condition of such magnitude that lining replacement should be made immediately. In this connection, it should be realized that only one such brake assembly has been shown in FIG. 1. However, it is obvious that such a brakeshoe lining wear detection circuitry as herein disclosed in connection with FIG. 1 and FIGS. 1a and 1b, as well as the circuits shown in FIGS. 3 and 4, that a separate electrical detecting circuit can be provided for each of the vehicle wheel and brake assemblies so that the operator of the vehicle will know precisely which of the four brake assemblies necessitates replacement of the brake lining upon visible indication by any one of the four provided lamps 41 for reach respective wheel brake assembly.

The vehicle brake assembly 52 of FIG. 2 is very similar as that shown in FIG. 1, except that, here, the structural means are provided with self-adjusting brakes found in most types of vehicles manufactured today. As in the case of FIG. 1, the vehicle brake assembly 52 of FIG. 2 is provided with a brakeshoe assembly 53 and brakeshoe assembly 54 which are secured to a support housing in the form of the brake backing plate 55 by means of the shoe holddown cup and spring assemblies 56. The shoe holddown cup and spring assemblies 56 are such that the shoes may be pivotally operative by means of operation of the fluid actuated wheel cylinder 57 through the wheel cylinder links 58 to force the upper ends of the brakeshoe assemblies 53 and 54 against the brake engaging surface of a brakedrum. In this connection, return springs 60 insure that the brakeshoe shoe assemblies 53 and 54 return to their original positions upon releasing of the vehicle brake pedal and thus release of the fluid pressure within the wheel cylinder 57. Again, an anchor guide pin 61 is provided at the upper end 62 of the brakeshoe assemblies 53 and 54 to guide the movement of the brakeshoe assemblies when operated. The other ends of the brakeshoe assemblies 53 and 54 as indicated at 63 are maintained in space relation by means of the brakeshoe adjusting screw assembly 64 and the connecting spring 65. THe detail of this brakeshoe adjusting screw assembly 64 is shown in FIG. 3 and includes a further embodiment of the limit switch means comprising this invention, as it will be explained hereinafter in connection with that figure. However, the operation of the brakeshoe adjusting screw assembly 64 is identical to the same assembly 10 as shown in FIG. 1.

Each of the brakeshoe assemblies 53 and 54 are provided with the brake linings 66 attached by rivets or other suitable means to the brakeshoes 67. In self-adjusting brake assemblies of the type shown in FIG. 2, brakeshoe assembly 53 is commonly referred to as the primary brakeshoe 67 and lining 66 whereas the brakeshoe assembly at 54 is commonly referred to as the second brakeshoe 67 and lining 66.

The self-adjusting brake mechanism 68 in the self-adjusting brake assembly 52 shown in FIG. 2 is being widely used in most vehicles today, it is only necessary that general reference be made to the operation of the self-adjusting brake mechanism for one to understand the limit switch means embodiment shown in FIGS. 2 and 3.

The self-adjusting brake mechanism 68 operates only when the brakes are being applied while the car is moving in a rearward direction. This action causes the secondary brakeshoe assembly 54 to move a predetermined distance towards the brakedrum assuming that the brake linings now are worn a sufficient degree to allow such a movement.

As the vehicle is moved in a reverse direction with the brakes applied, a frictional force develops between the primary brakeshoe assembly 53 and the brakedrum. This frictional force causes the primary brakeshoe assembly 53 to be forced against the anchor pin 61. At the same time, fluid pressure in the wheel cylinder 57 forces the upper end of the secondary brakeshoe assembly 54 away from the anchor pin 61. As the secondary brakeshoe assembly 54 moves away from the anchor pin 61, the upper end 70 of the adjuster lever 71 is prevented from moving due to the actuating link 72 which is tied to the anchor pin guide 61 by means of the actuating link 73. Since the adjuster lever 71 pivots on the secondary brakeshoe assembly 54, the movement of the assembly through actuating link 73 will cause the lower end of the adjuster lever 71 to be applied against the star wheel 80 of the brakeshoe adjusting screw assembly 64.

If the blank brake linings are worn a sufficient degree to allow the secondary brake shoe assembly 54 to move, as mentioned above, the adjuster lever will be caused to pivot about its axis at 56 turning the adjusting screw star wheel 80 one or two teeth, depending upon the amount of lining wear. If lining wear is not sufficient, the adjuster lever 71 in making this pivotal movement will not sufficient to rotate the adjusting screw star wheel 80. When the brake shoe assembly is released, the actuating lever 71 will be again repositioned into adjusting position relative to the adjusting screw star wheel 80 by means of its return spring 74.

There is also provided the override spring as shown at 75 in FIG. 2 which is connected between the adjuster lever 71 and the activating lever 72 to provide an override feature which allows the secondary brakeshoe assembly 54 to be applied in the reverse in the event that the adjusting screw assembly 64 is frozen preventing the adjusting lever 71 from operating.

When the vehicle is moving in a forward direction, and the brakes are applied, the upper end 62 of the secondary brakeshoe assembly 54 is forced against the anchor pin 61 and the adjuster lever 71 does not operate.

It can be seen from all the foregoing description concerning the self-adjusting brake mechanism 68 that means are provided for adjusting the position of the brakeshoe assemblies 53 and 54 relative to the brake-engaging surface of the brakedrum to compensate for brake lining wear.

Attention now is directed to FIG. 3 which is a cross-sectional view of the brakeshoe adjusting screw assembly 64 FIG. 2. As indicated above, this assembly is substantially identical to that of the conventional vehicle assembly of FIG. 1 except for including the limit switch means 81 in the assembly as shown in FIG. 3. The assembly consists of the adjusting screw's nut section 82 which is internally threaded to receive in the threadable cooperative relation the externally threaded adjusting screw stud section 83 which is also provided with the star wheel 80. The adjusting screw stud section 83 is also provided with the stud 84 to receive the socket member 85. In order to prevent any freezing action between operation of the socket member 85 and the adjusting screw stud section 83, a thrust washer 86 may be provided between the socket member 85 and the star wheel 80. The bifurcated nipples 87 are provided to engage the ends 63 of the brakeshoe assemblies 53 and 54.

The limit switch means 81 of FIG. 3 is of similar nature to that of the embodiment as shown in FIG. 1a in that it is provided with an outwardly biased actuator 88. By adjustment to the star wheel 80 in permitting the adjusting screw stud section 83 to be withdrawn from the adjusting screw nut section 82, the actuator 88 will move outwardly from its housing 90 of the switch means 81 until it is in its closed position causing actuation of the electrical detecting circuit, previously described, through electrical conductor 91.

As can be seen in FIG. 3, the actuator 88 is shown in its open contact position with the adjusting screw stud section 83 threadably adjusted inwardly within the adjusting screw nut section 82 its full extent, which is the relative positional relationship of these sections when the brake linings 66 are new or have just been replaced.

Figure 4:
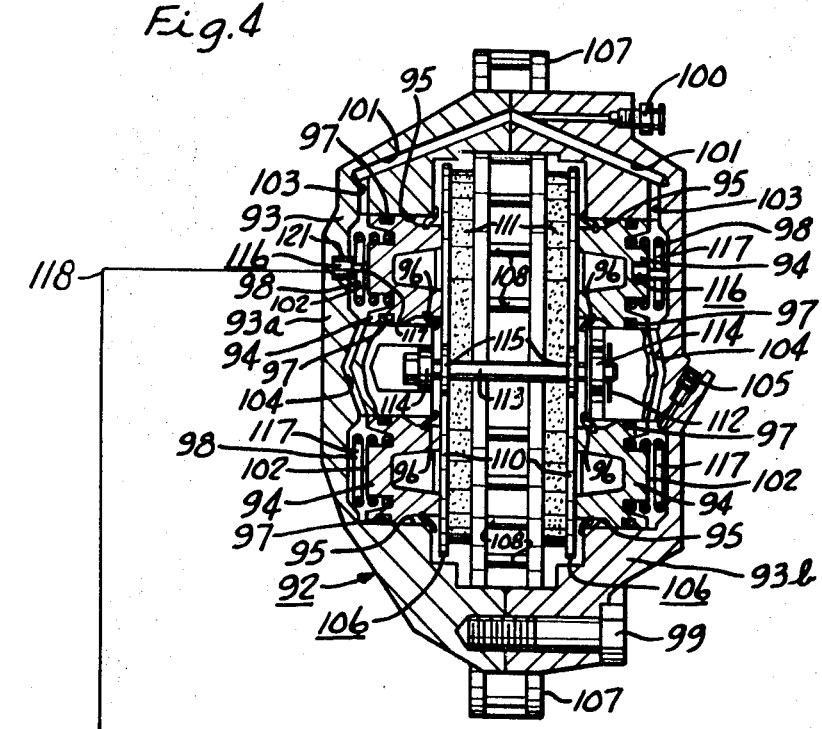
FIG. 4 is a cross-sectional view of a disc brake assembly employing the brake wear detection means of this invention.

Reference is now made to the embodiment shown in FIG. 4 wherein limit switch means comprising this invention is utilized in connection with a disc brake assembly 92. This type of brake assembly is now being readily used in motor vehicles being manufactured today with the intent of the vehicle manufacturing industry to even use this type of brake assembly altogether in years to come due to its simplicity and operating efficiency.

The disc brake assembly 92 consists of a support housing for pair of brakeshoes in the form of caliper 93 comprising caliper halves 93a and 93b which are secured together by means of caliper bolts, one of which is shown at 99. Within the caliper housing 93 there are provided the four pistons 94, which are mounted for reciprocal movement within the cylinder 95. Each of the pistons 94 is provided with a piston seal 96 to prevent the inclusion of dirt from entering between the pistons and cylinder wall and affecting the operation of the pistons. Also, a seal 97 is provided to prevent leakage of brake fluid from between the piston and cylinder walls to the piston seals 96. Further, each of the pistons 94 is provided with a spring 98 to forwardly bias the pistons 94 toward the center of the caliper housing 93. As can be seen in FIG. 4 the pistons 94 are arranged in oppositely disposed pairs in the caliper housing halves 93a and 93b.

Fluid pressure for causing the pistons to move outwardly under cylinders 95 is provided at the fitting 100, through the vents 101 and thence against the back surfaces 102 of each of the pistons 94 by means of the diagonal vents 103 and the inner connecting vents 104. A caliper bleed screw is provided at 105 to relieve the fluid pressure from within the caliper housing vents so that pressure may be relieved from the rearward ends 102 of the pistons 94 to permit removal of the brakeshoe assembly 106 which will be described in more detail below.

The brake engaging member consists of the braking disc 107 which is provided also with the air vent louvers 108 to provide for cooling. The brakeshoe assemblies 106 consist of the brakeshoes 110 to which is secured by riveting or other suitable means the brake linings 111.

As by way of a general explanation of the operation of the disc brake assembly 92, fluid pressure is built up on the braking system when the brake pedal of the vehicle is depressed and is transmitted through the vents 101, 103 and 104 to be applied against the rearward surfaces 102 of the pistons 94. The pistons 94 are caused to move out from within their cylinders 95 and force the brakeshoe assemblies 106 toward the center of the caliper housing 93. The brakeshoe assemblies 106 are thus caused to clamp the braking disc 107 between the brake linings 111 with equal and opposite force of the pistons 94. When the brake pedal of the vehicle is released, hydraulic pressure decreases and the piston spring 98 in the cylinders 95 will position the pistons 94 so that the brake linings 111 are held lightly against the braking disc 110 ready for the next braking application.

The disc brake linings are small frictional segments as compared to the side surfaces of the annular brake disc 107 thereby operating only on a small area of the brake disc surface with the other portions of the brake disc 107 being exposed to the atmosphere for dissipation of heat.

Since the brake linings 111 lightly contact against the brake discs 107 when the brakeshoe assemblies 106 are not in operative positions, there was no necessity for automatically compensating for brake lining wear as in the case of the conventional brake structure of FIG. 4 and, therefore, no such adjustment is necessary.

To remove the brakeshoe assemblies 106 to permit the replacement of the brake linings 111, the cotter pin 112 of the shoe retaining pin 113 is removed and the shoe retaining pin 113 is pulled from right to left out of the caliper retainers 114 and the brakeshoe eye retainers 115. By use of a suitable tool, the respective pairs of pistons 94 can be held within their cylinders 95 against the force of the compression piston springs 98 to permit outward removal of the brakeshoe assembly for replacement of the lining 111.

The limit switch means embodiment as shown in FIG. 4 comprises the plunger-type switch 116 which is housed within the caliper half 93a with its actuator 117 in engagement with the back surface 102 of the pistons 94. Obviously, only one such switch 116 need be used in the caliper half 93a and, further, it is not necessary to employ one of these switches in the caliper half 93b since the wear of the brake linings 111 housed within either caliper half is the same due to the fact that the applying of the brakeshoe assemblies 106 against the surfaces of the brake disc 107 is with equal and opposite force. However, if desirable, a switch 116 may be employed in the caliper half 93b.

As in the case of previously explained embodiments, the plunger-type switch 116 is connected by electrical conductor 118 to the electrical detection circuit 120 previously disclosed and described in FIGS. 1a, 1b, and 3.

It can be seen that when the linings 111 of the brake shoe assemblies 106 have worn to the preselected wear limit, which in disc-type brake assemblies is approximately 0.020 inch or less in thickness over the heads of the rivets attaching the linings to the brakeshoes 110, the actuator 117 will have been extended a sufficient limit from within housing 121 to bring about a closed contact condition activating the electrical detection circuit 120. It should be noted that compression piston springs 98 prevent the pistons 94 from ever returning to their original position when the linings 111 are new so that upon the switch actuator being placed in its closed position, the electrical detection circuit 120 will remain in operation whenever the ignition of the vehicle is closed until the brake linings 111 have been properly replaced.

In connection with caliper half 93b the plunger-type switch 116 is shown housed within the piston 94 rather than the wall of the caliper housing shown in connection with caliper half 93a. Thus, the switch 116 can be secured within the caliper half or within the respective piston in order to sense the difference in distance representative of the switch in its open contact position and its closed contact position, which is the same incremental difference in distance of the brake lining's depth when the linings are new as compared to when these linings 111 are worn to the preselected wear limit.

Since no self-adjustment or any other type of adjustment is needed in connection with the positioning of the brake linings 111 relative to the brake disc 107 as compared with the conventional brake assemblies of FIGS. 1 and 3, it is even more imperative that these linings be inspected periodically to insure that they do not wear too thin and cause their rivets to score the very smooth finished surfaces of the brake disc 107. Such rate of wear of the brake linings will vary considerably with driving conditions as well as the driving habits of the operator. Since these types of brake assemblies are being more and more used on vehicles manufactured today, the brakeshoe lining wear detection means to indicate when the brake linings have worn to the preselected wear limit indicative of lining replacement becomes very much more imperative, especially in view of the increasing demands for such safety features imposed by the government.

We claim:

1. In a vehicle brake assembly, a brakeshoe lining wear detection means to indicate when the brake lining has worn to a preselected wear limit indicative of lining replacement comprising a brakeshoe assembly mounted in a support housing and having a brake lining secured to a brakeshoe movable a sufficient distance within said brake assembly to achieve brake application with the lining in frictional engagement with a brake engaging member, said detection means characterized by a limit switch means secured relative to said support housing and having a movable actuator positioned contiguous to said brakeshoe assembly in a manner to be sensitive to the forward and rearward movement of said brakeshoe relative to said support housing in applying said brake lining to said brake engaging member, said actuator having a travel distance from its open contact position to its closed contact position respectively equal to the difference in brake lining depth when the lining is new and when the lining is worn to said preselected wear limit, and an electrical detecting circuit electrically connected to said limit switch means operative when said actuator is in its closed contact position.

2. In the vehicle brake assembly of claim 1, characterized in that said brakeshoe assembly consists of a pair of oppositely disposed brakeshoes with attached linings pivotally operative to achieve brake application with their brake linings in frictional engagement with a brakedrum comprising said brake-engaging member, brake-adjusting means operatively connected to one end of each of said brakeshoes and adapted to adjust said brakeshoes for proper alignment relative to said brakedrum to compensate for progressive wear of said brakeshoe linings, said limit switch means mounted on said support housing with said actuator positioned to be contiguous to at least one of said brakeshoe assemblies to operate said electrical detection circuit upon brake lining wear reaching said preselected wear limit.

3. In the vehicle brake assembly of claim 2, characterized in that said switch means actuator is an outwardly spring-biased plunger within a switch housing mounted on the support housing with the outer end of its plunger engaging the surface of one of said brakeshoes, said plunger extended its full length from within said switch housing to operate said electrical detection circuit upon brake lining wear reaching said preselected wear limit.

4. In the vehicle brake assembly of claim 2, characterized in that said switch means actuator is a toggle with its switch housing mounted on said support housing with said toggle secured by linking means to one of said brakeshoes, said toggle placed in its closed position to operate said electrical detection circuit upon application of said brakeshoe assembly upon brake lining wear reaching said preselected wear limit.

5. In the vehicle brake assembly of claim 2, characterized in that said brake-adjusting means comprises a brakeshoe adjusting screw assembly consisting of a threaded stud section and a hollow threaded nut section, a spring-biased plunger switch comprising said limit switch means housed in the bottom of said hollow threaded nut section with the outer end of its plunger placed in its closed position to operate said electrical detection circuit when said stud section is threadably adjusted outwardly of said nut section in performing said shoe-drum alignment indicative of brake lining wear reaching said preselected wear limit.

6. In the vehicle brake assembly of claim 5, characterized in that said brake-adjusting means is of the self-adjusting type.

7. In the brakeshoe assembly of claim 1, characterized in that said brakeshoe assembly comprises a pair of oppositely disposed brakeshoes with attached linings secured within a caliper housing comprising said support housing and reciprocally operative toward one another by pairs of oppositely disposed piston means to achieve brake application with their brake linings in frictional engagement with a brake disc comprising said brake engaging member positioned within and between said brake linings, said limit switch means mounted within said caliper housing with said actuator positioned to be contiguous to one of said brakeshoes through one of said piston means to operate said electrical detection circuit upon brake lining wear reaching said preselected wear limit.

8. In the vehicle brake assembly of claim 7, characterized by fluid-operated brake pistons mounted for reciprocation in said caliper housing to engage said brakeshoes, said limit switch means mounted on the rear of at least one of said pistons with said actuator positioned to be contiguous to said caliper housing to operate said electrical detection circuit upon brake lining wear reaching said preselected wear limit.

9. In a vehicle brake assembly, a brake lining wear detection means to indicate when the brake lining is worn to a preselected wear limit indicative of replacement comprising a brakeshoe assembly consisting of a pair of oppositely disposed brakeshoes and a brake lining secured to each of said brakeshoe and movable a sufficient distance to achieve brake application with the brake linings in frictional engagement with a brakedrum, self-adjusting brake means secured within said brake assembly and adapted to adjust said brakeshoes for proper alignment relative to the brakedrum to compensate for progressive wear of the brakeshoe lining, said brake lining wear detection means characterized by limit switch means mounted in said self-adjusting brake means to complete and permit operation of said detection circuit when said self-adjusting brake means has adjusted for said brake shoe-drum alignment indicative of brake lining wear reaching said preselected wear limit.